(12) United States Patent
Lierow

(10) Patent No.: US 7,367,699 B2
(45) Date of Patent: May 6, 2008

(54) EMERGENCY LIGHT IN A MULTILEVEL AEROPLANE

(75) Inventor: Hans-Christian Lierow, Hamburg (DE)

(73) Assignee: Lufthansa Technik AG, Hamburg (DE)

(*) Notice: Subject to any disclaimer, the term of this patent is extended or adjusted under 35 U.S.C. 154(b) by 0 days.

(21) Appl. No.: 10/547,009

(22) PCT Filed: Feb. 19, 2004

(86) PCT No.: PCT/EP2004/001647

§ 371 (c)(1),
(2), (4) Date: Aug. 25, 2005

(87) PCT Pub. No.: WO2004/076280

PCT Pub. Date: Sep. 10, 2004

(65) Prior Publication Data

US 2006/0163429 A1    Jul. 27, 2006

(30) Foreign Application Priority Data

Feb. 25, 2003   (EP) .................................. 03004089

(51) Int. Cl.
*F21W 101/06* (2006.01)
(52) U.S. Cl. .................. 362/471; 362/470; 362/84; 362/153; 362/576
(58) Field of Classification Search .............. 362/84, 362/576, 153, 153.1, 145, 470, 471
See application file for complete search history.

(56) References Cited

U.S. PATENT DOCUMENTS

| 5,724,909 A | * | 3/1998 | Pitman et al. .............. 116/202 |
| 5,775,016 A | | 7/1998 | Chien |
| 6,145,996 A | * | 11/2000 | Shimada ..................... 362/146 |
| 6,207,077 B1 | | 3/2001 | Burnell-Jones |
| 6,213,622 B1 | * | 4/2001 | Shimada et al. ............ 362/146 |
| 6,276,634 B1 | * | 8/2001 | Bodle ....................... 244/118.5 |

FOREIGN PATENT DOCUMENTS

| EP | 0 514 650 A1 | 11/1992 |
| EP | 0 828 657    | 3/1998 |
| EP | 0 828 657 B1 | 7/1999 |
| WO | WO 01/52224  | 7/2001 |

OTHER PUBLICATIONS

"Photoluminescent markings for escape routes" (Webber et al) published Sep. 1989.
"Recommendation for Low-Level Lighting Requirements on Passenger Ships" (US Department of Transportation) issued Feb. 1992 ("D3").
"The Evacuation Problem and Glow-In-The-Dark Escape Systems" (John L. Strauss) Building Fire Safety—Caution Magazine, published Apr. 1985 ("D4").
PSPA Standard 002 Part 2, issued 1993.

* cited by examiner

*Primary Examiner*—Laura Tso
(74) *Attorney, Agent, or Firm*—Alix, Yale & Ristas, LLP

(57) ABSTRACT

The invention relates to an aeroplane comprising several decks which are arranged above each other, for passengers, freight and/or crew members, also comprising at least one staircase connected to the decks. Said aeroplane is characterized in that the staircase is provided with photoluminescent markings which enable the staircase to be recognized easily, even in poor lighting conditions, whereby orientation of passengers and crew members to exit is made easier in the event of an emergency.

18 Claims, 1 Drawing Sheet

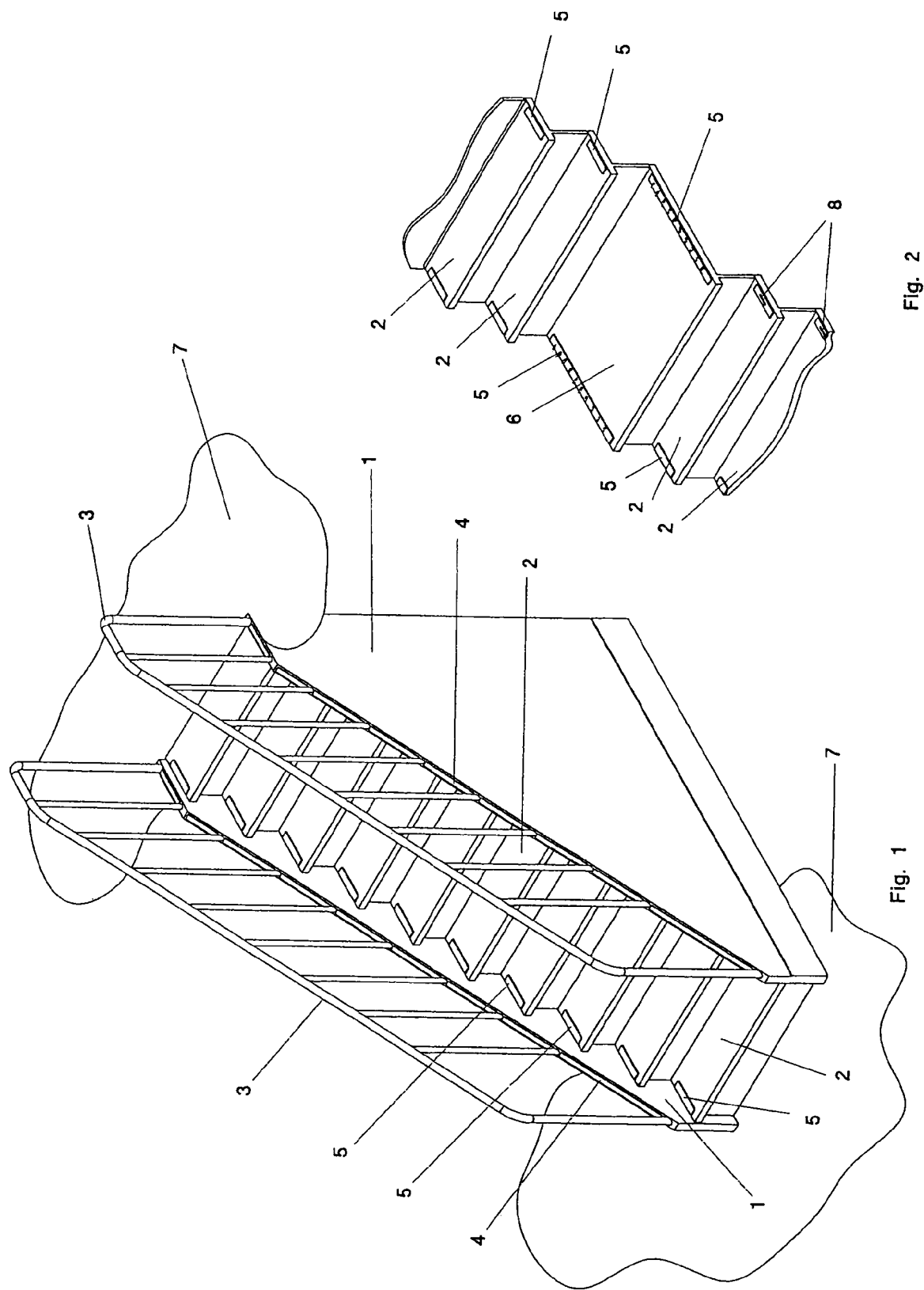

EMERGENCY LIGHT IN A MULTILEVEL AEROPLANE

BACKGROUND OF THE INVENTION

The invention relates to an airplane having a plurality of decks, arranged one on top of the other, for passengers, freight and/or crew and at least one staircase connecting the decks.

It is known in airplanes to arrange luminaires in a line in the aisles, said luminaires being switched on in the event of emergency in order to show the passengers the way to the emergency exit. Although these systems are supplied by a separate emergency battery such that the markers operate even in the event of a failure of the general on-board electrical system, the emergency power supply may also be disrupted, with the result that the markers can no longer be switched on in the event of an emergency. It is also possible for sections of the markers to be incapable of being operated, which makes it necessary for them to be replaced before the airplane is started, which in turn results in late starts and delays.

It is known, in order to avoid these disadvantages, to attach fluorescent strips or rails using photoluminescent substances to the floor at the sides of the aisles, and these fluorescent strips or rails can, in the event of an emergency, point the passengers in the direction of the exit even when there is a failure of the electrical system of the airplane (EP 0 828 657 B1). The photoluminescent materials have the property of remaining lit themselves even for some time after they are no longer illuminated.

An airplane is known which has a plurality of decks, arranged one on top of the other, for passengers, freight and/or crew and at least one staircase, which connects the decks and is provided with photoluminescent rail- or strip-like markers which are arranged on both sides of the staircase steps at the lateral ends thereof (U.S. Pat. No. 5,7756,016).

The invention is based on the object of equipping an airplane of the type mentioned initially such that all of the passengers/crew members, i.e. even passengers and crew members who are located on different decks, can safely find the way to an emergency exit.

SUMMARY OF THE INVENTION

The solution according to the invention comprises linear markers, which can be seen from above and are essentially uninterrupted, being arranged at the sides of the steps, following the ascent of the staircase. These inclined, straight markers guide the passengers in the correct direction and have a particularly psychologically favorable effect. At the same time, the passengers recognize two different converging lines or groups of lines even in emergency situations and poor visual conditions, the continuous markers and the markers arranged on the staircase steps being arranged at an angle with respect to one another if both the markers at the lateral ends of the steps and the markers following straight slopes of the ascent of the steps are provided. The passenger thus immediately recognizes that the markers relate to a staircase and not to, for example, an aisle. This may also be quite important if the airplane is no longer horizontally aligned after an accident.

In the event of smoke, fire or other situations causing panic, it is naturally very important to guide the passengers as safely as possible to the exit. In this case, the measure which goes beyond that of the prior art and the importance of which is at first perhaps not fully recognized may be of quite critical importance.

If the staircase has a landing, markers are expediently also provided in the region of the landing.

It may also be expedient to use markers having different colors and luminosity. Using such other types of markers, it is possible, for example, to indicate the start of the staircase, the end of the staircase or a landing.

The invention may be used, as mentioned, in staircases with or without a landing. They can be used not only in staircases which are straight but also in spiral staircases. In this case, one continuous, lateral marker is provided at the outer periphery of the staircase, and the other uninterrupted marker is provided on the column of the spiral staircase.

Indicators such as arrows, other symbols or writing such as "EXIT", "STAIRS" and the like are expediently provided on the markers.

BRIEF DESCRIPTION OF THE DRAWINGS

The invention will be described by way of example below with reference to advantageous embodiments and with reference to the attached drawings, in which:

FIG. 1 shows a perspective view of a section of a staircase arranged in an airplane; and FIG. 2 shows another embodiment of such a staircase.

DETAILED DESCRIPTION OF THE PREFERRED EMBODIMENTS

The staircase shown in FIG. 1, which connects two decks, indicated by 7, has side walls 1, between which the steps 2 of the staircase are arranged. In the embodiment shown in FIG. 1, the walls 1 protrude beyond the steps 2 at the top. Banisters 3 are fixed to said walls 1. Strip-like, photoluminescent markers 4 are fitted on the upper edges of the walls 1. These photoluminescent markers 4 "become charged" with light during normal operation of the airplane when the lighting system in the airplane is switched on. If the lighting system is switched off or if it fails, such as in the event of an emergency, the photoluminescent markers have the property of continuing to illuminate for a certain period of time, such that they can show passengers the way to the exit.

The markers 4 need not be arranged at the top but may also be arranged inside on the wall 1. However, markers 4 are not only provided on the walls 1 but also on the lateral ends of the steps 2. These markers are indicated by the reference numeral 5 in FIG. 1. The markers 4 running in a straight line and descending at an angle form an angle with the markers 5 arranged on the steps 2, with the result that the passenger can immediately recognize the fact that they relate to a staircase.

In the embodiment shown in FIG. 2, the staircase also has a landing 6 in addition to the steps 2. Both the steps 2 and the landing 6 are in this case indicated by lateral photoluminescent markers 5. In this case, the markers 5 have another color and/or luminosity in the region of the landing 6, which is indicated in FIG. 2 by a dashed line. This difference in the color and/or the luminosity makes it clearer that there is a landing here. Precisely in the event of an emergency in which there is a stressful situation or even one inducing panic, this particular feature is of particular importance. 8 denotes indicators such as arrows, writing and the like on the markers 5.

The invention claimed is:

1. In an airplane having a plurality of decks, arranged one on top of the other, and at least one staircase, which connects the decks, a first set of photoluminescent strip-like markers arranged on both sides of the staircase steps at the lateral ends thereof, and a second set of photoluminescent strip-like markers which can be seen from above and are essentially uninterrupted, arranged at the sides of the steps, following the ascent of the staircase.

2. In the airplane as claimed in claim 1, wherein the staircase has a landing, and photoluminescent markers are provided in the region of the landing.

3. In the airplane as claimed in claim 1, wherein the markers have different colors.

4. In the airplane as claimed in claim 1, wherein the markers have indicators selected from the group consisting of arrows, symbols and writing.

5. In the airplane as claimed in claim 2, wherein the markers have different colors.

6. In the airplane as claimed in claim 2, wherein the markers have indicators selected from the group consisting of arrows, symbols and writing.

7. In the airplane as claimed in claim 3, wherein the markers have indicators selected from the group consisting of arrows, symbols and writing.

8. In the airplane as claimed in claim 5, characterized in that the markers have indicators selected from the group consisting of arrows, symbols and writing.

9. In the airplane as claimed in claim 1, wherein the markers have different luminosity.

10. In the airplane as claimed in claim 2, wherein the markers have different luminosity.

11. In the airplane as claimed in claim 9, wherein the markers have indicators selected from the group consisting of arrows, symbols and writing.

12. In the airplane as claimed in claim 10, wherein the markers have indicators selected from the group consisting of arrows, symbols and writing.

13. In the airplane as claimed in claim 3, wherein markers having different luminosity are used.

14. In the airplane as claimed in claim 5, wherein markers having different luminosity are used.

15. In an airplane having a plurality of decks, arranged one on top of the other, and at least one staircase, which connects the decks, said staircase including a pair of opposed side walls and steps extending there between, photoluminescent strip-like markers arranged on both sides of the staircase steps at the lateral ends thereof, and photoluminescent strip-like markers descending down said staircase and forming an angle with said markers on said stairs, said markers descending down said staircase being on said side wall.

16. In an airplane as claimed in claim 15, wherein there are two opposed sets of markers descending down said staircase, one on each side wall.

17. In the airplane as claimed in claim 16, wherein said descending markers are on said top of each side of said side wall.

18. In the airplane as claimed in claim 15, wherein said descending markers descend in a straight line.

* * * * *